(12) United States Patent
Fichtl

(10) Patent No.: US 11,940,024 B2
(45) Date of Patent: Mar. 26, 2024

(54) ELECTROMECHANICALLY SWITCHABLE BRAKE HAVING INTEGRAL DAMPER STRUCTURE

(71) Applicant: Chr. Mayr GmbH + Co. KG, Mauerstetten (DE)

(72) Inventor: Michael Fichtl, Westendorf (DE)

(73) Assignee: Chr. Mayr GmbH + Co. KG, Mauerstetten (DE)

( * ) Notice: Subject to any disclaimer, the term of this patent is extended or adjusted under 35 U.S.C. 154(b) by 458 days.

(21) Appl. No.: 17/283,795

(22) PCT Filed: Nov. 11, 2019

(86) PCT No.: PCT/EP2019/080815
§ 371 (c)(1),
(2) Date: Apr. 8, 2021

(87) PCT Pub. No.: WO2020/099296
PCT Pub. Date: May 22, 2020

(65) Prior Publication Data
US 2021/0381561 A1  Dec. 9, 2021

(30) Foreign Application Priority Data

Nov. 13, 2018 (DE) .................. 10 2018 008 899

(51) Int. Cl.
*F16D 65/00* (2006.01)
*F16D 59/00* (2006.01)
(Continued)

(52) U.S. Cl.
CPC ......... *F16D 65/0006* (2013.01); *F16D 59/00* (2013.01); *F16D 65/186* (2013.01); *H01F 7/081* (2013.01); *F16D 2121/22* (2013.01)

(58) Field of Classification Search
CPC ............... F16D 2121/22; F16D 65/186; F16D 65/0006; H01F 7/081
See application file for complete search history.

(56) References Cited

U.S. PATENT DOCUMENTS 2,850,124 A * 9/1958 Grote ...................... F16D 59/00
192/109 A
3,618,725 A * 11/1971 Penkal, Jr. ............ F16D 27/112
188/73.35

(Continued)

FOREIGN PATENT DOCUMENTS

CN  202790245  3/2013
CN  103912609 B  5/2016

(Continued)

OTHER PUBLICATIONS

International Search Report and Written Opinion prepared by the European Patent Office for PCT/EP2019/080815, dated Jan. 17, 2020, 11 pages.

(Continued)

*Primary Examiner* — Robert A. Siconolfi
*Assistant Examiner* — James K Hsiao
(74) *Attorney, Agent, or Firm* — Chernoff, Vilhauer, McClung & Stenzel, LLP

(57) ABSTRACT

An electromagnetically switchable brake, preferably spring-loaded brake, comprising at least one coil carrier (3) and at least one armature plate (1), wherein the axial distance of the coil carrier and armature plate relative to out another is variable, comprising at least one rotor (7) or at least one hub of a shaft to be braked, and comprising damping members arranged between the armature plate (1) and coil carrier (3), between the end faces of the coil carrier (3) and armature plate (1) which face one another. It is considered to be novel and inventive that the solid body of coil carrier (3) and/or armature plate (1) has an integral damper structure (D), (Continued)

Figure 1:
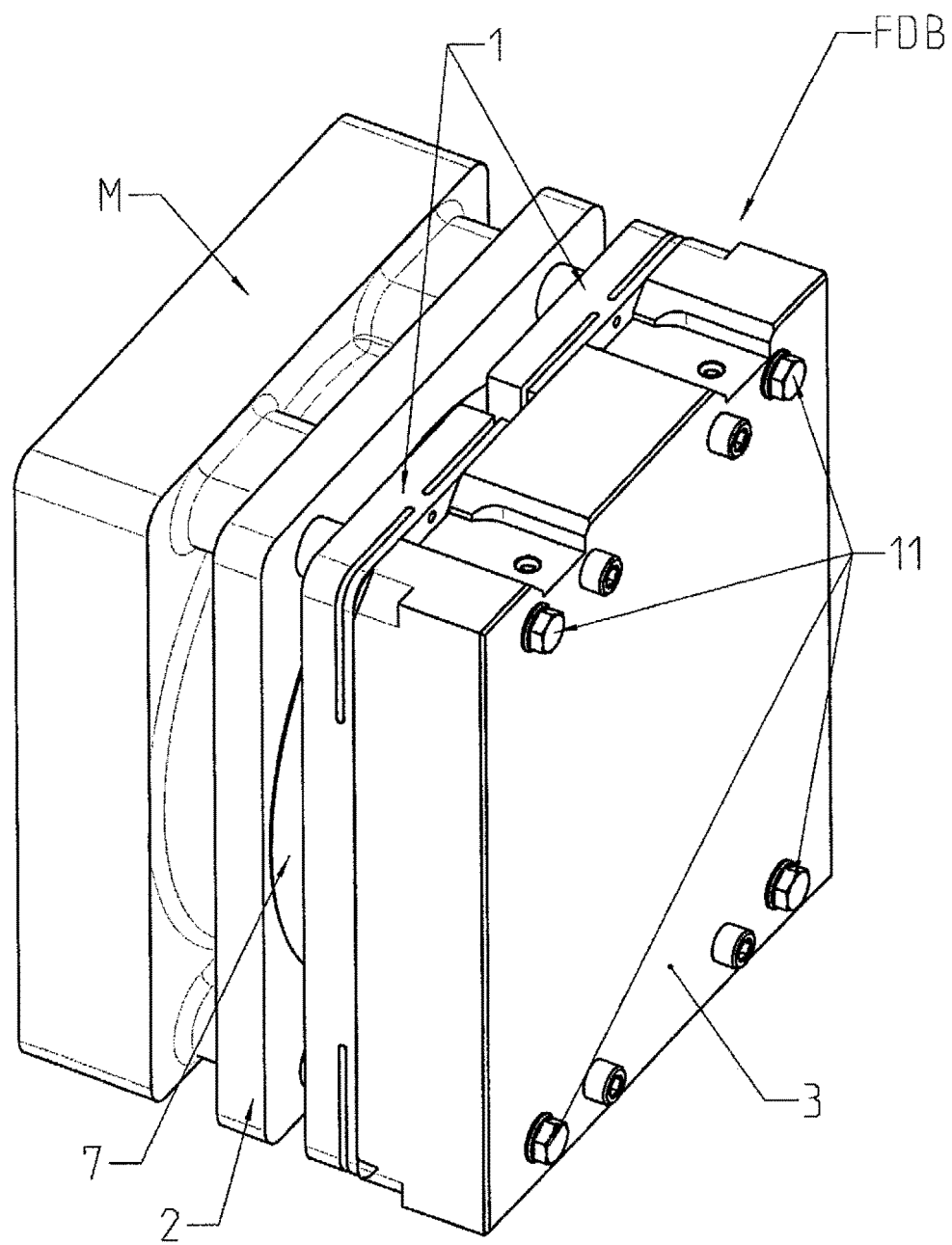

which is composed of an least one elastic tab (12) and a foot (13), the elastic tab (12) being an integral part of the solid body of the armature plate (1) or of the coil carrier (3) (FIG. 1.1).

12 Claims, 20 Drawing Sheets

(51) Int. Cl.
*F16D 65/18* (2006.01)
*H01F 7/08* (2006.01)
*F16D 121/22* (2012.01)

(56) References Cited

U.S. PATENT DOCUMENTS

| | | | | |
|---|---|---|---|---|
| 4,804,075 | A * | 2/1989 | Koitabashi | F16D 27/112 |
| | | | | 192/209 |
| 4,838,391 | A * | 6/1989 | Schenk | F16D 59/02 |
| | | | | 192/109 A |
| 5,035,305 | A * | 7/1991 | Lammers | F16D 55/40 |
| | | | | 188/73.38 |
| 5,154,261 | A | 10/1992 | Tanaka et al. | |
| 5,274,290 | A * | 12/1993 | Fischer | F16D 65/12 |
| | | | | 310/93 |
| 5,315,200 | A * | 5/1994 | Lemieux | H02K 1/185 |
| | | | | 310/407 |
| 5,372,228 | A * | 12/1994 | VanLaningham | F16D 27/112 |
| | | | | 335/271 |
| 5,421,436 | A * | 6/1995 | Lindner | F16D 65/0006 |
| | | | | 188/73.38 |
| 5,739,610 | A * | 4/1998 | Nemoto | F16D 55/2245 |
| | | | | 310/93 |
| 6,105,736 | A * | 8/2000 | Akita | F16D 65/0006 |
| | | | | 188/251 A |
| 6,182,803 | B1 * | 2/2001 | Hirai | F16D 55/02 |
| | | | | 188/161 |
| 6,202,804 | B1 * | 3/2001 | Dropmann | F16D 55/04 |
| | | | | 188/171 |
| 6,237,730 | B1 * | 5/2001 | Dropmann | F16D 55/28 |
| | | | | 188/163 |
| 6,321,883 | B1 * | 11/2001 | Pfann | F16D 65/0006 |
| | | | | 188/161 |
| 6,811,001 | B2 * | 11/2004 | Hiyoshi | F16D 65/186 |
| | | | | 188/161 |
| 7,063,190 | B1 * | 6/2006 | Sylvan | F16D 65/186 |
| | | | | 188/161 |
| 7,699,145 | B2 * | 4/2010 | Ericson | B66D 5/30 |
| | | | | 187/250 |
| 9,638,272 | B2 * | 5/2017 | Olkkonen | F16D 65/28 |
| 10,184,530 | B2 * | 1/2019 | Saito | F16D 27/112 |
| 10,731,719 | B2 * | 8/2020 | Crippa | F16D 65/0978 |
| 11,536,333 | B2 * | 12/2022 | Fichtner-Pflaum | |
| | | | | F16D 65/0006 |
| 2008/0251346 | A1 * | 10/2008 | Rettmar | H02K 5/04 |
| | | | | 192/226 |
| 2014/0048359 | A1 * | 2/2014 | Olkkonen | F16D 65/28 |
| | | | | 188/72.3 |
| 2017/0198760 | A1 * | 7/2017 | Saito | F16D 27/112 |
| 2020/0072303 | A1 * | 3/2020 | Fichtner-Pflaum | F16D 59/02 |
| 2021/0207667 | A1 * | 7/2021 | Fichtner-Pflaum | F16D 59/02 |
| 2021/0231181 | A1 * | 7/2021 | Fichtner-Pflaum | |
| | | | | H02K 7/1025 |

FOREIGN PATENT DOCUMENTS

| | | |
|---|---|---|
| CN | 106838068 A | 6/2017 |
| DE | 1600229 A | 1/1970 |
| DE | 29611732 U1 | 9/1996 |
| DE | 19622983 C1 | 11/1997 |
| DE | 19925173 A1 | 12/2000 |
| DE | 10143499 A1 | 3/2003 |
| DE | 102007025081 A1 | 12/2008 |
| DE | 102013001899 A1 | 8/2014 |
| DE | 102017000846 A1 | 8/2018 |
| EP | 0209943 A1 | 1/1987 |
| EP | 0907840 A1 | 4/1999 |
| EP | 1423626 B1 | 12/2004 |
| ES | 2332480 T3 | 2/2010 |
| JP | S6218436 U | 2/1987 |
| JP | H058066 U | 2/1993 |
| JP | 2000186724 A | 7/2000 |
| JP | 2000220674 A | 8/2000 |
| JP | 2008275103 A | 11/2008 |
| JP | 2008540968 A | 11/2008 |
| JP | 2009185874 A | 8/2009 |
| JP | 2010014156 A | 1/2010 |
| JP | 2011112099 A | 6/2011 |
| JP | 2015230020 A | 12/2015 |
| SU | 504520 | 2/1976 |
| WO | 2006/033149 A1 | 3/2006 |

OTHER PUBLICATIONS

Examination Report prepared by the Japanese Patent Office (JPO) for Application No. JP 2021-525750, dated Dec. 25, 2023, 6 pages.

* cited by examiner

Fig. 1.1
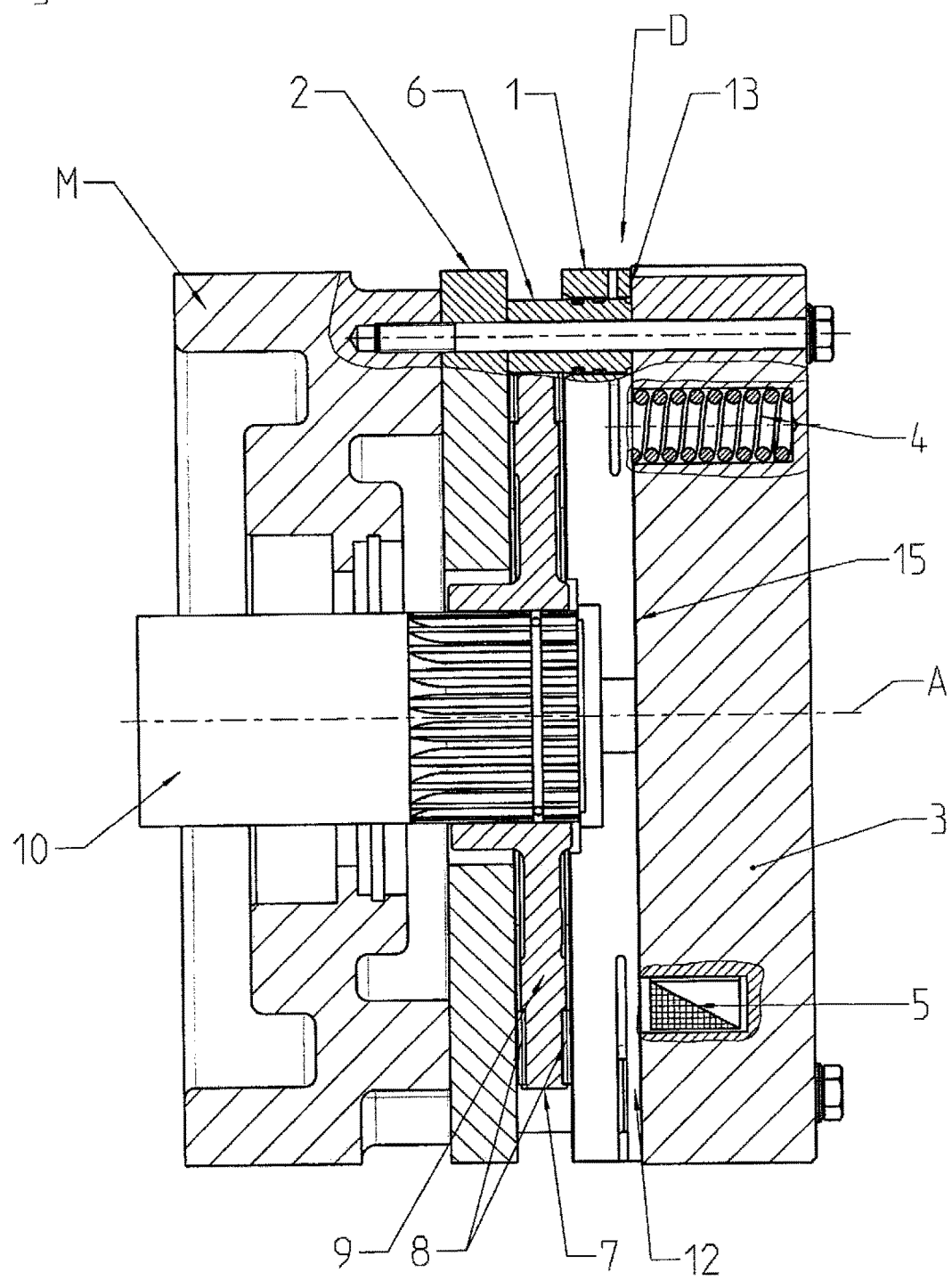

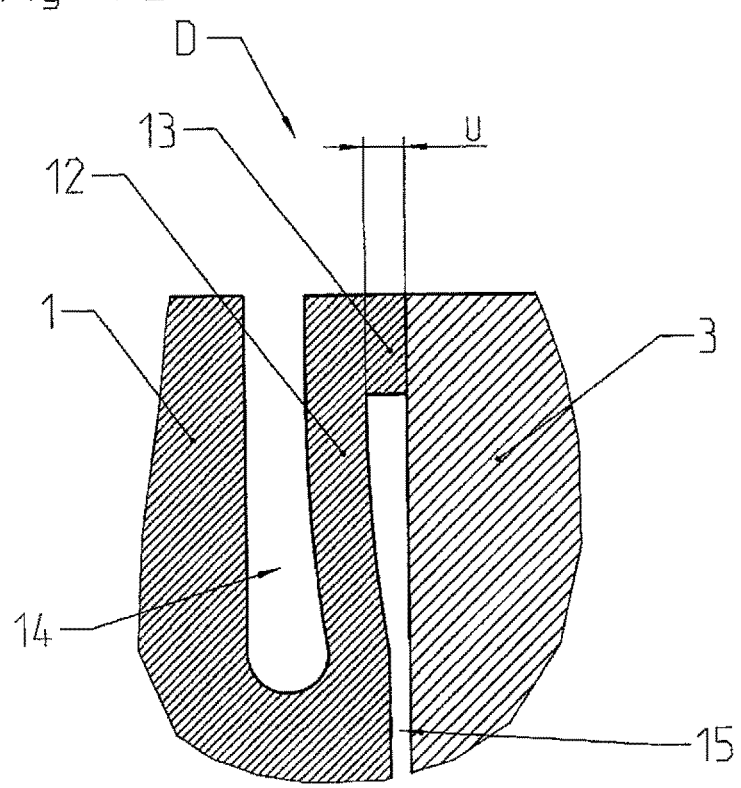
Fig. 1.2

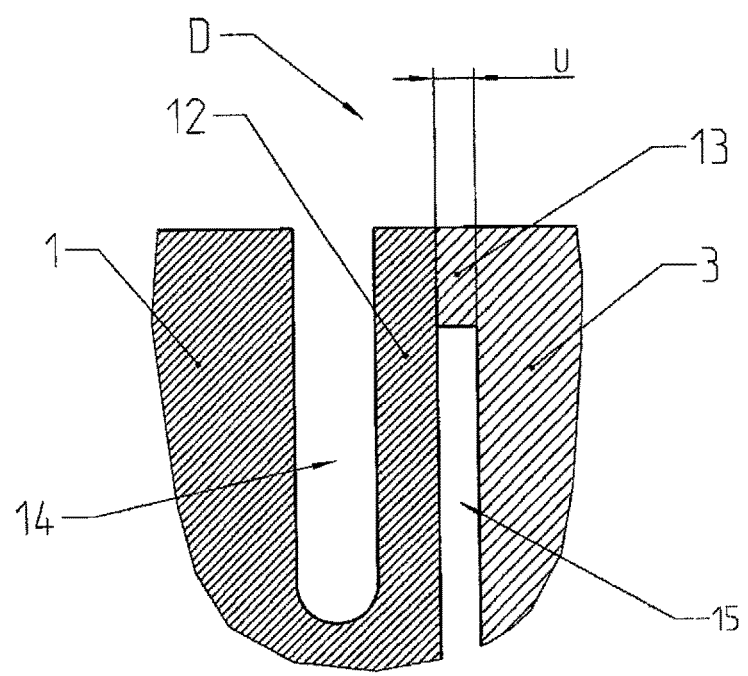

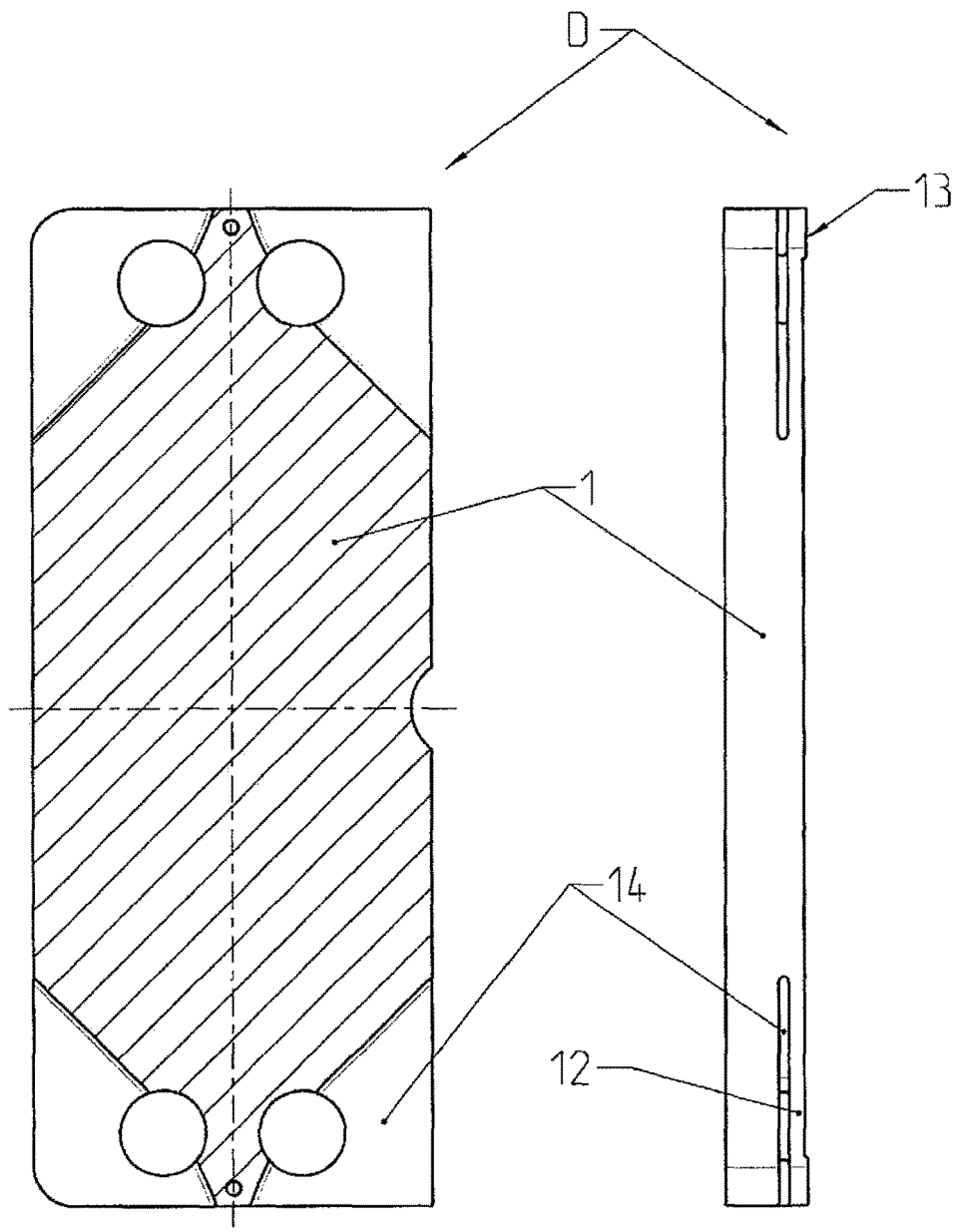

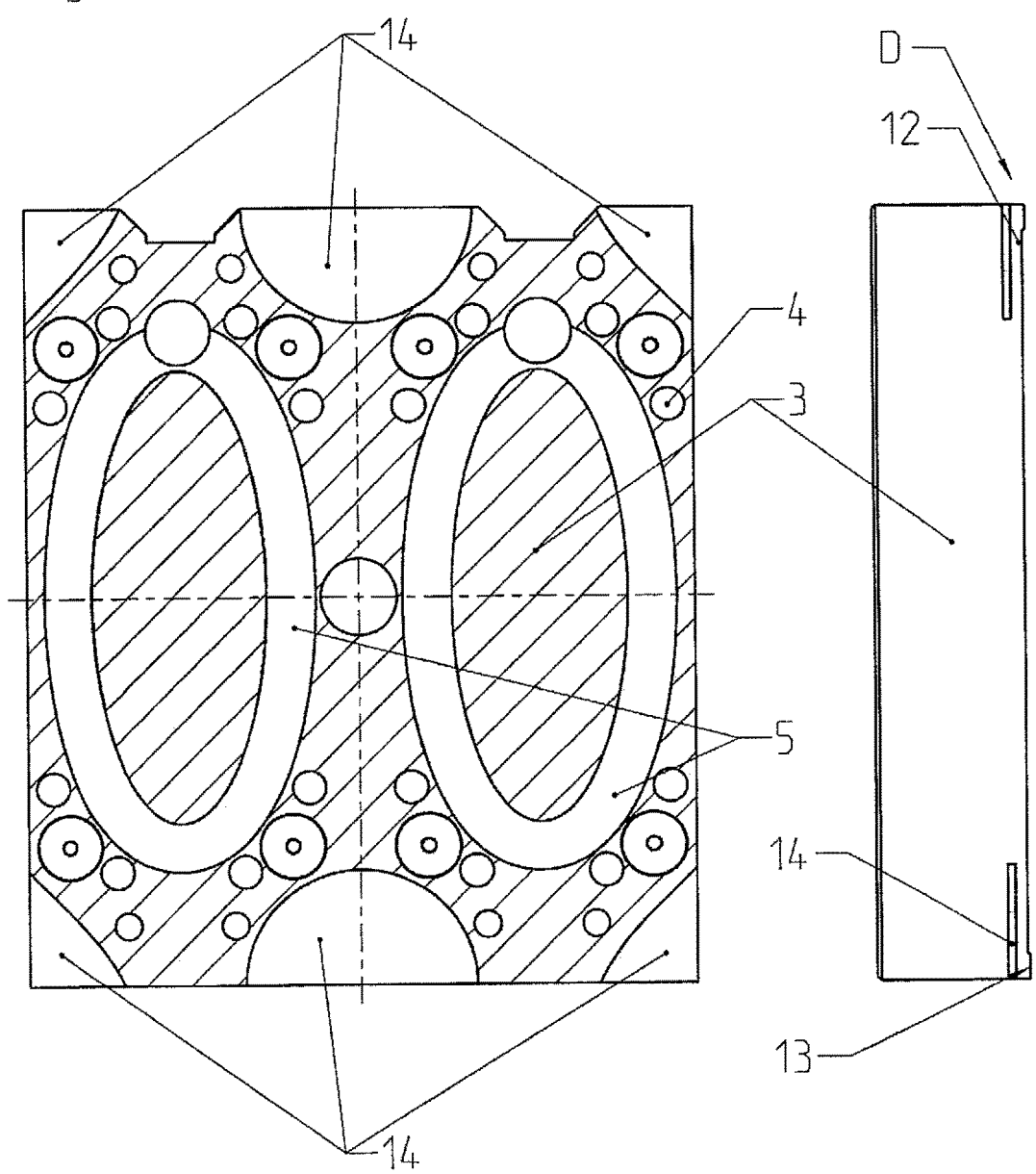

Fig. 4
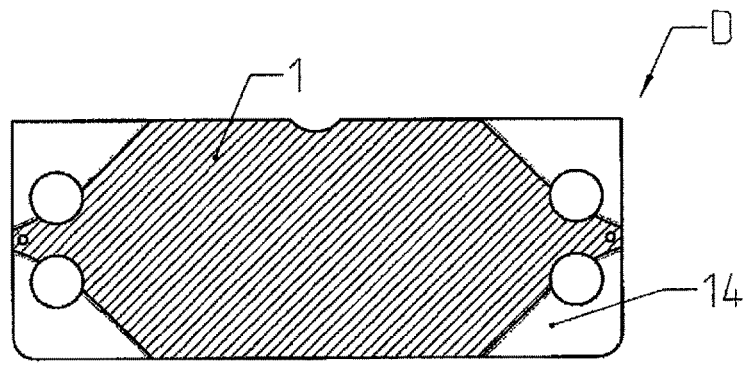
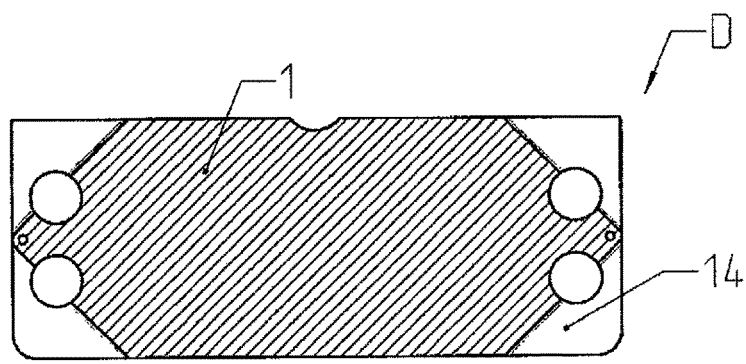
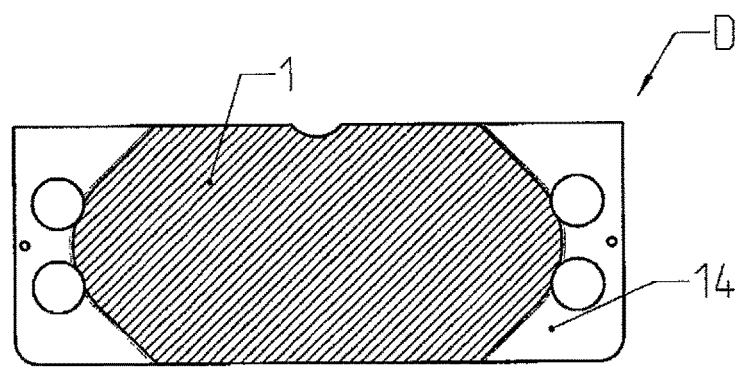

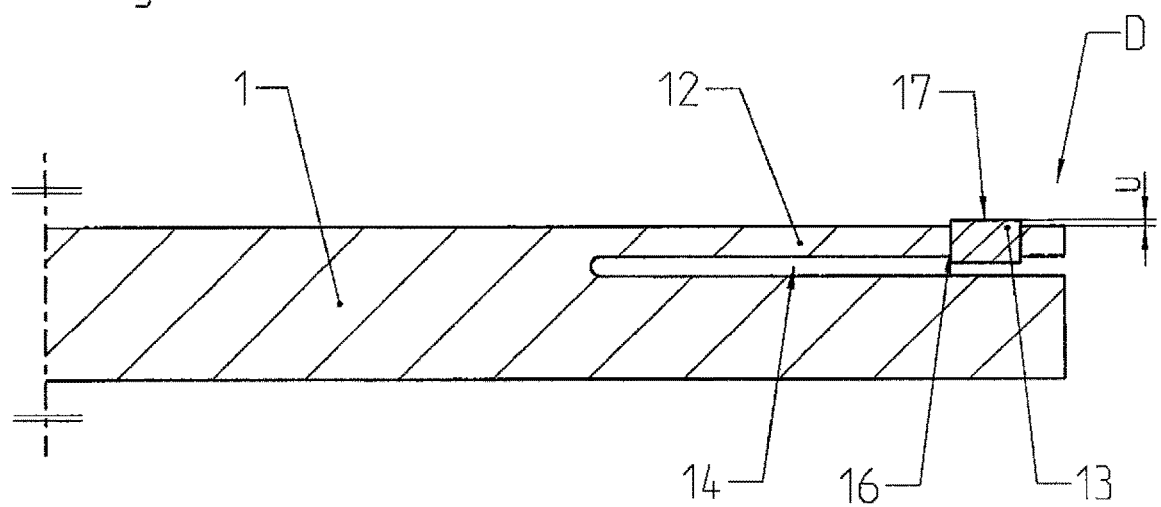

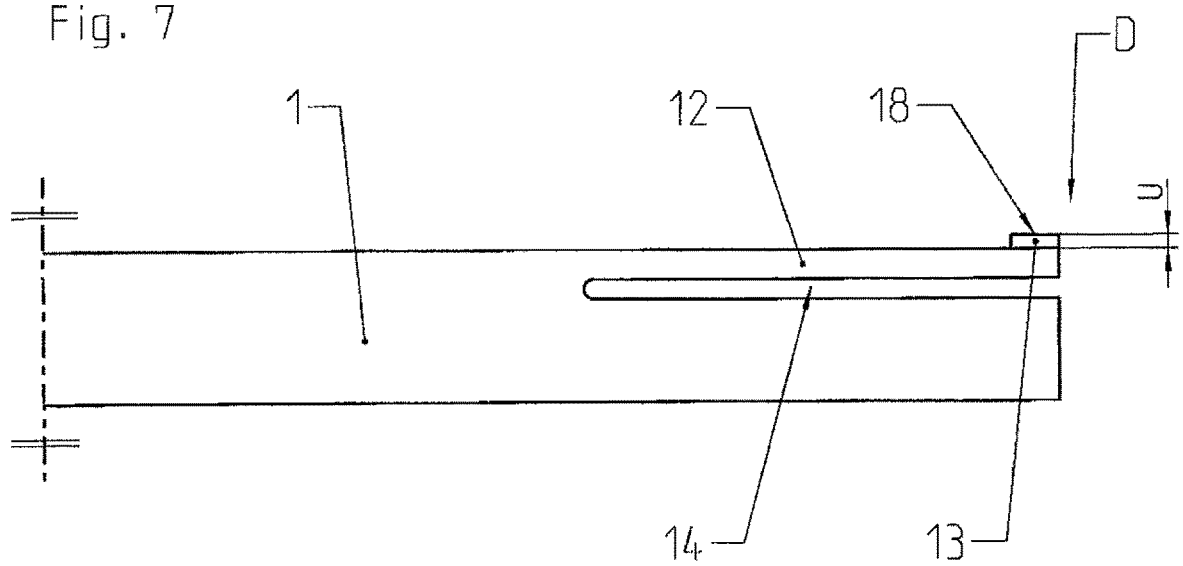

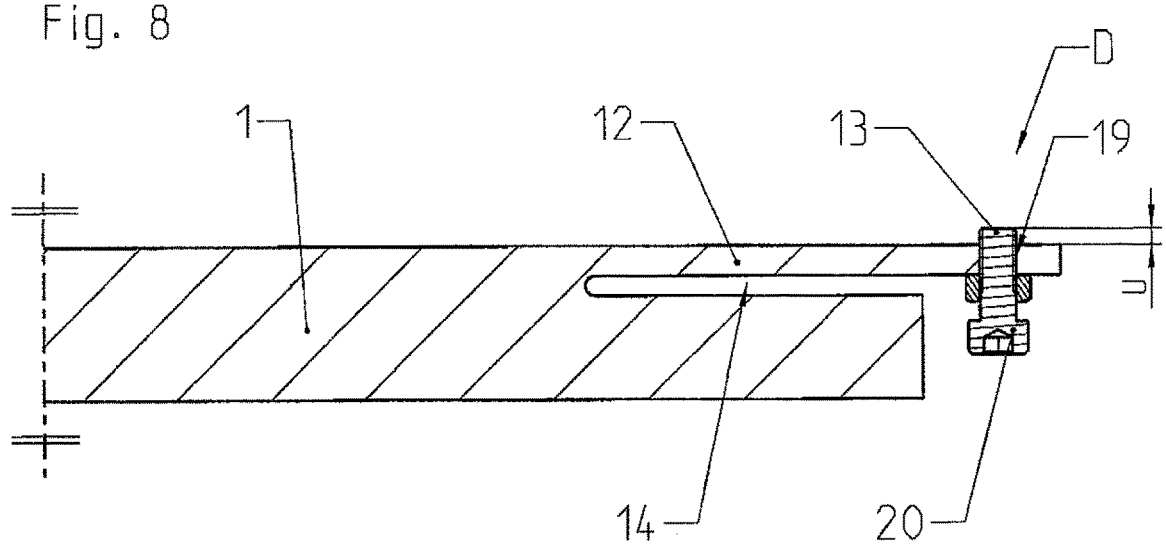

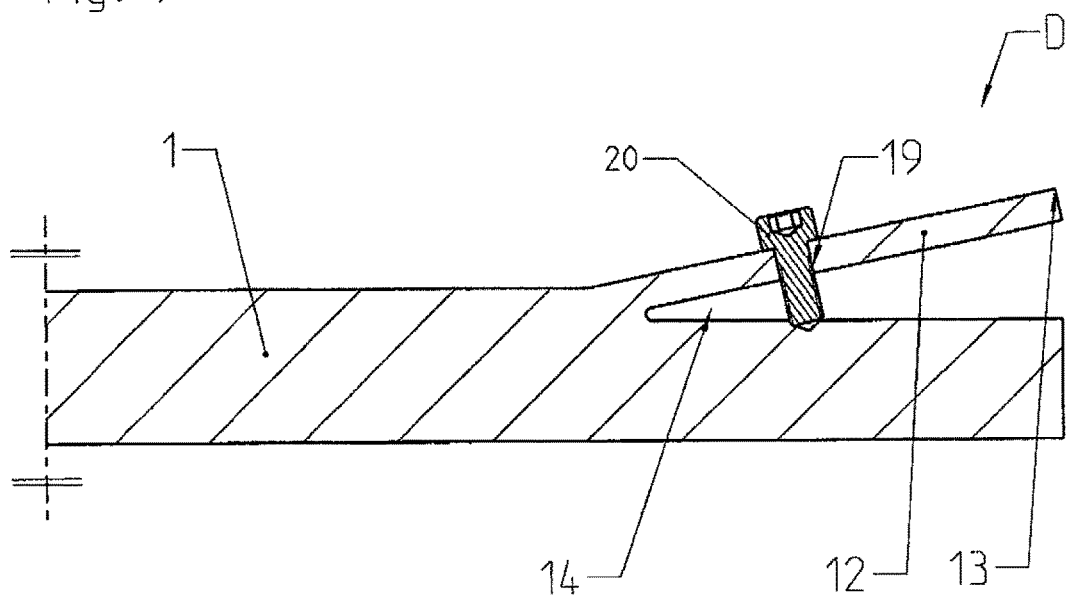

Figure 15:
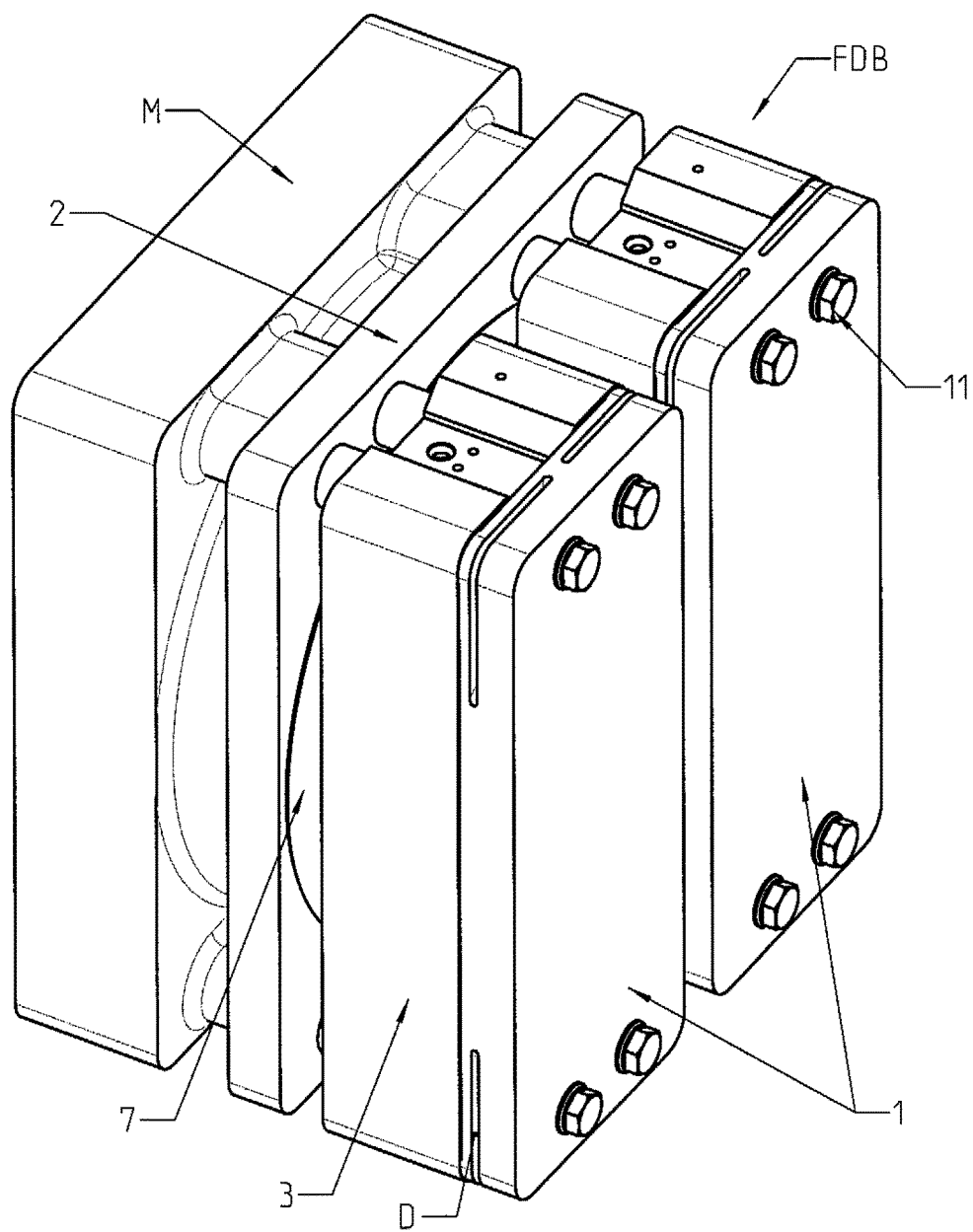

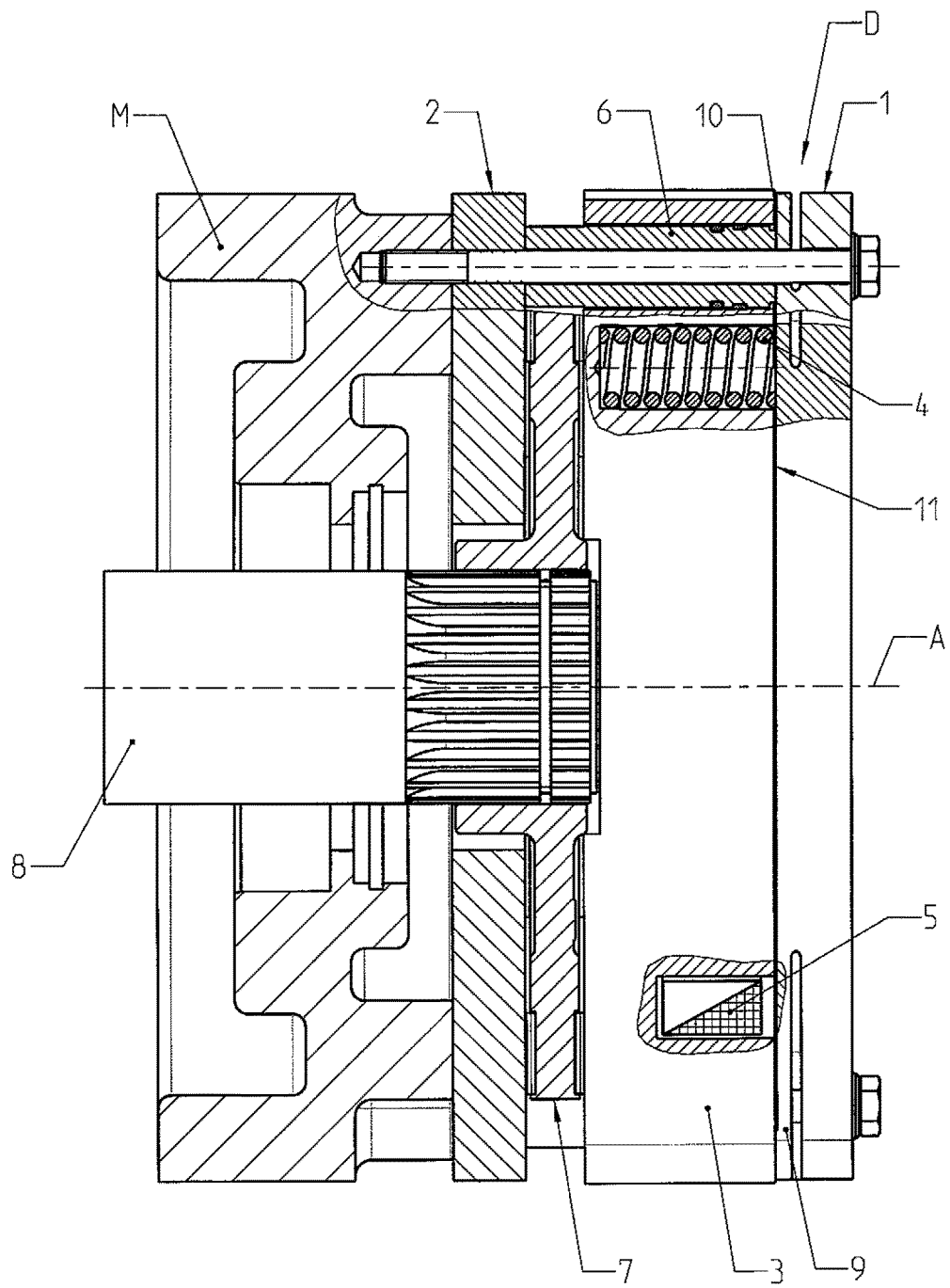
Fig. 15.1

ELECTROMECHANICALLY SWITCHABLE BRAKE HAVING INTEGRAL DAMPER STRUCTURE

The present invention relates to an armature disk or a coil carrier with an integral damper structure for fail-safe brakes and working current brakes according to the preamble of the main claim. In this case, fail-safe brakes preferably include friction brakes such as, for example, electromagnetically releasing spring-pressure brakes or permanent magnet brakes.

Fail-safe brakes are generally understood to mean braking systems which develop their braking effect without an external supply of energy, that is to say, for example, in the current-less state. Working current brakes work on the opposite principle. Working current brakes are therefore generally understood to mean braking systems that require an external energy supply in order to be able to develop their braking effect. This includes so-called pole face brakes in particular.

Fail-safe current brakes are used, among other things, in noise-sensitive fields of application. These include, for example, passenger lifts or podiums and rope hoists on theater stages. The tasks of the brakes include holding static loads and retarding uncontrolled drive movements in emergency situations.

The brakes described above are only opened or closed in normal operation, which can take place in a very frequent sequence. The drive is either released for movement or a static load is held. In normal operation, deceleration is taken over by a regulated drive.

In such normal operation, the switching noises resulting from opening and closing the brake must be as low as possible so that they do not have a disruptive effect on their surroundings. In particular, the well-being of people in the vicinity must not be impaired. It is also important to keep unwanted vibrations, which can lead to noise development, as low as possible.

In the event of an emergency, the switching noise and the braking noise play a subordinate role.

Several possibilities for reducing switching noise from brakes are known from the prior art. It is proposed in EP1423626 B1 to arrange a plurality of elastic elements of different rigidity between the coil carrier and the armature disk. Here, the elements of lower rigidity should touch the armature disk and at the same time the coil carrier in the open and closed state of the brake. It is also proposed here to make the bias of the damping elements variable by means of adjusting screws.

This type of noise damping is preferably carried out with elastomers. These, in turn, have stiffnesses that change with temperature, so that the noise-reducing effect is only effective in a limited temperature range. In addition, these dampers exhibit a relatively high force hysteresis between loading and unloading.

In addition, the adjustment of this damping system with the aid of the adjusting screws requires specially trained employees. The adjustment of the damping system also means expenditure of time and money, In U.S. Pat. No. 9,638,272 B2 a damping plate is proposed, which is arranged between the coil carrier and the armature disk. This is elastically deformed with the movement of the armature disk and thus generates a damping force.

The damping plate, which is preferably made of spring steel, is designed in a large format. It covers a large part of the inner and outer magnetic pole of the coil carrier. Since this is arranged between the coil carrier and the armature disk, it must have a high degree of accuracy in terms of its thickness and evenness, since the air gap between the coil carrier and the armature disk must be designed to be uniform. The damping plate represents an additional size in the tolerance chain of the air gap, which worsens the overall tolerance situation of the air gap. Inaccuracies in the realm of the air gap can lead to increased magnetic resistance, which can be expressed in a reduced pulling force in the magnetic circuit.

A uniformly large air gap and thus a uniform dropping off or attraction of the armature can only be made possible through high accuracy. Irregularities can manifest themselves in tilting movements of the armature disk, which in turn can lead to increased switching noises.

DE 10 2017 000 846 A1 proposes a damping plate which is located between the armature disk and the coil carrier. The damping plate has several elevations distributed over the circumference, which are intended to act as cushioning elements when the brake is released.

Since the damping plate is not pretensioned when the armature disk is in the fallen condition, it cannot effectively dampen the switching noise that occurs when the armature disk is attracted to the coil carrier.

The damping plate, which is presented as a stamped/bent component, is also subject to undesirable inaccuracies in terms of its dimensional accuracy. These can manifest themselves in the form of gaps between the damping plate and the armature disk, which hinder the magnetic flux between the coil carrier and the armature disk.

The state of the art presents further examples of electromagnetically switchable brakes and similar devices which are concerned with different concepts for damping switching noises. The following patent publications are mentioned as further examples; DE19622983C1, DE19925173A1, DE102013001899A1, DE102007025081A1 and DE1600229A.

The object of the present invention is therefore to propose a technical improvement to the prior art for an electromagnetically switchable brake, which describes a damping of the switching noises of an electromagnetically switchable brake, which can be manufactured and installed in a simple manner. In addition, this should act as uniformly as possible over the largest possible temperature range.

According to the invention, this aim is achieved with the features of the main claim. The integral damper is presented as an elastic tab with an elevation. Hereinafter, this elevation is referred as a foot. One or more such elastic tabs can be provided per brake circuit. The tabs can be situated on the side of armature disk or of the coil carrier and are made from the same component as the armature disk or as the coil carrier. The foot does not necessarily have to be part of the elastic tab. This can also be carried out on the opposing component. The height of the foot is greater than the air gap of the brake. Thus, the tab is always in contact with the opposite component and is pre-tensioned. If the armature disk is moved in the direction of the coil carrier, one or more tabs are elastically deformed and the resulting reaction force counteracts the movement of the armature disk, which leads to a more gentle impact of the armature disk on the coil carrier and thus causes a quieter noise. If the armature disk is to move away from the coil carrier, the pre-tensioning of the tabs leads to an earlier movement of the armature disk as long as the electromagnet still has disproportionately more force than the provided compression springs. This also results in a slower movement of the armature disk and thus a quieter noise when it impacts the brake rotor.

Since at least the elastic tab of the integral damper structure is incorporated into the coil carrier or the armature disk, it consists of the same material as the component itself. Due to their functionality, armature disks and coil carriers are usually made of soft magnetic steels. Compared to plastics and elastomers, these materials show a much smaller change in their stiffness in the temperature range relevant for brakes (−40° C. to +120° C.). The integral damper structure thus acts uniformly in this temperature range.

It is also advantageous that the production of the integral damper structure, depending on the processing machines and tools, can take place in the same set-up as the other processing steps on the armature disk or on the coil carrier. This fact is beneficial to the accuracy of the integral damper structure and simultaneously advantageous from an economic perspective.

The design of the length and the thickness of the elastic tab allows the rigidity of the integral damper structure to be adapted to the forces prevailing in the brake. The preload of the integral damper structure can be determined by the height of the foot.

If the foot of the integral damper structure is made from the same component as the elastic tab or incorporated into or attached to the opposite component, then an adjustment of the damping system during the assembly of the brake is not necessary. The effort involved in installing the brakes is thus reduced.

A hole can also be incorporated into the tab. A pin can be pressed or glued into this hole. This then acts as the foot of the elastic tab. The pre-tensioning of the integral damper structure can in turn be preset with the distance between the pin surface and the elastic tab.

The elastic tab can also initially be made flat, that is to say without a foot. This can then be glued on in the form of sheet metal.

It is also possible, instead of a foot, to machine a semicircular groove into the tab and to insert a hardened cylindrical roller into it, which acts as the foot of the elastic tab. When the armature disk is tightened and dropped, the elastic tab can perform a rolling movement over these cylindrical rollers, which leads to reduced wear on the foot.

The foot of an elastic tab can also be produced by way of an embossing process. For this purpose, a recess can be stamped into the tab from one side by means of a stamp in such a way that the displaced material protrudes on the opposite side in the form of a foot.

A threaded hole can also be incorporated into the tab. In this case, a screw can act as the foot of the tab. The height of the foot can be adjusted before, during or after the brake is installed. The pre-tension is therefore adjustable.

It is also possible, with the aid of a threaded hole provided in the elastic tab and a screwed-in screw, to press the elastic tab from its base component (armature disk or coil carrier). In this embodiment, the elastic tab can also be provided without a foot. The foot is formed by the set deformation of the elastic tab.

The embodiments of the integral damper structure not finally described can be implemented on the side of the armature disk and/or of the coil support. The geometrical design of the outer contour of these components plays only a subordinate role. The integral damper structure can be integrated in rectangular, square, triangular, round, oval or also in polygonal armature disks and coil carriers.

In addition to the invention described here, the armature disk and/or the coil carrier can additionally be designed with a shock absorber. This can be, for example, elastomers, plastics, cellulose or fibre materials. Such shock absorbers are not pre-tensioned and only touch the armature disk or the coil carrier when a brake is closed. With the help of such a shock absorber, the noise when the armature disk impacts the coil carrier can be further reduced.

The advantage of the invention over the prior art is that the integral damper structure can be integrated in the course of manufacturing the armature disk or the coil carrier. It can be made adjustable and non-adjustable. In the non-adjustable case, the assembly of the brake is simplified. In addition, the integral damper structure is less dependent on the prevailing temperature and thus enables its use in larger temperature ranges. In addition, it was found empirically that the force hysteresis of the integral damper structure when opening and closing a brake is small compared to known damper systems.

Figure 5:
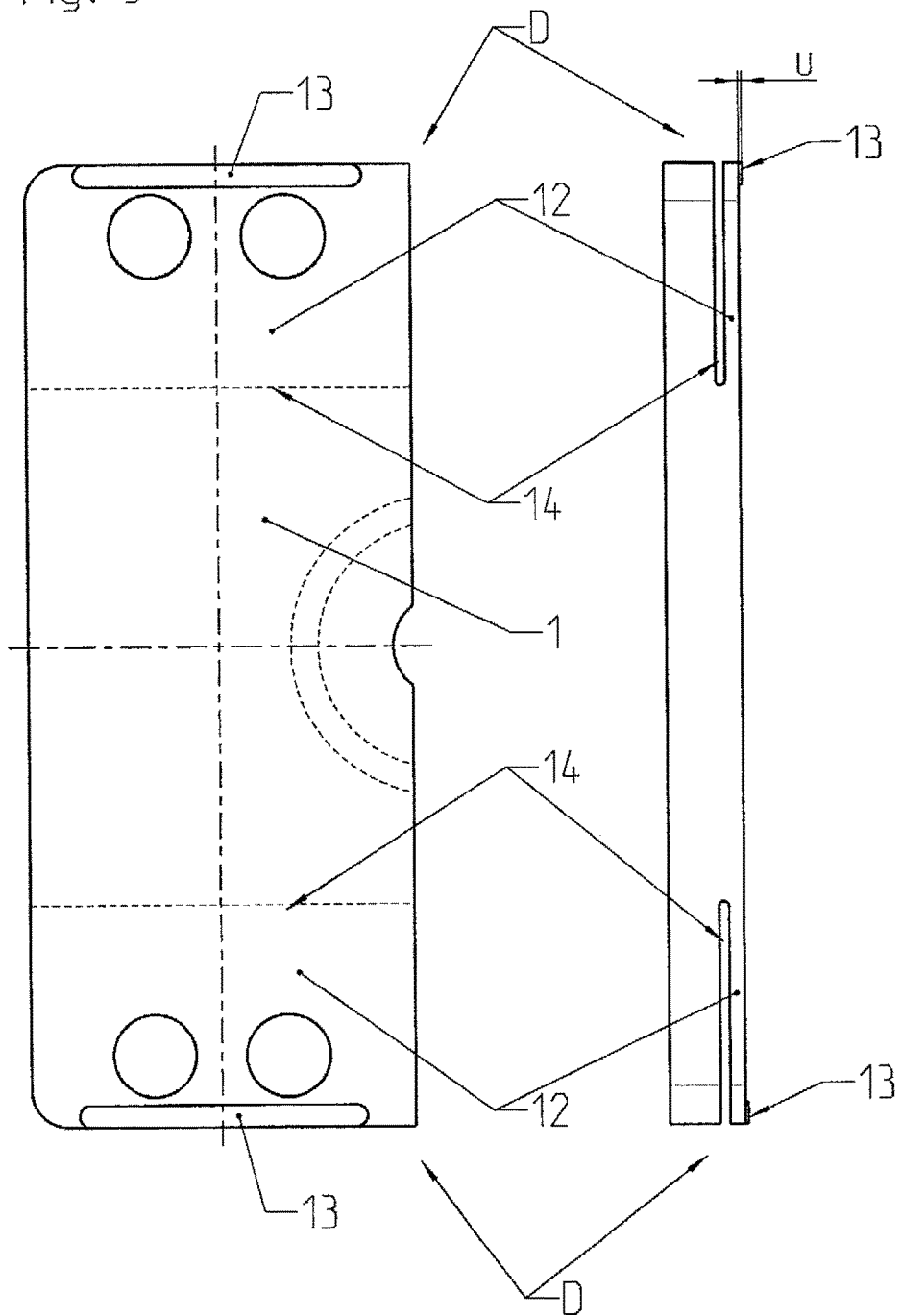
Figure 9A:
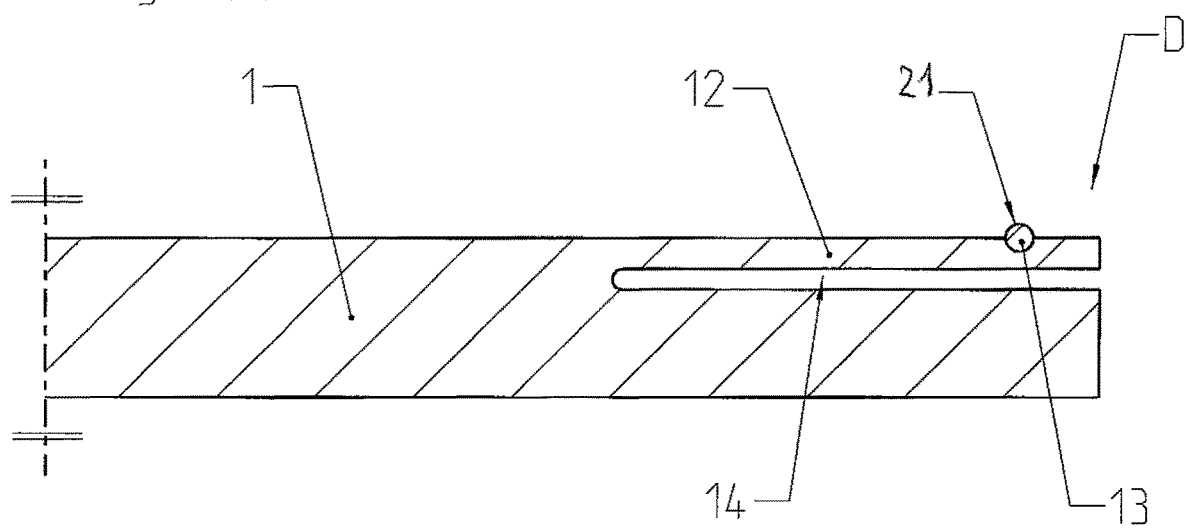
Figure 10:
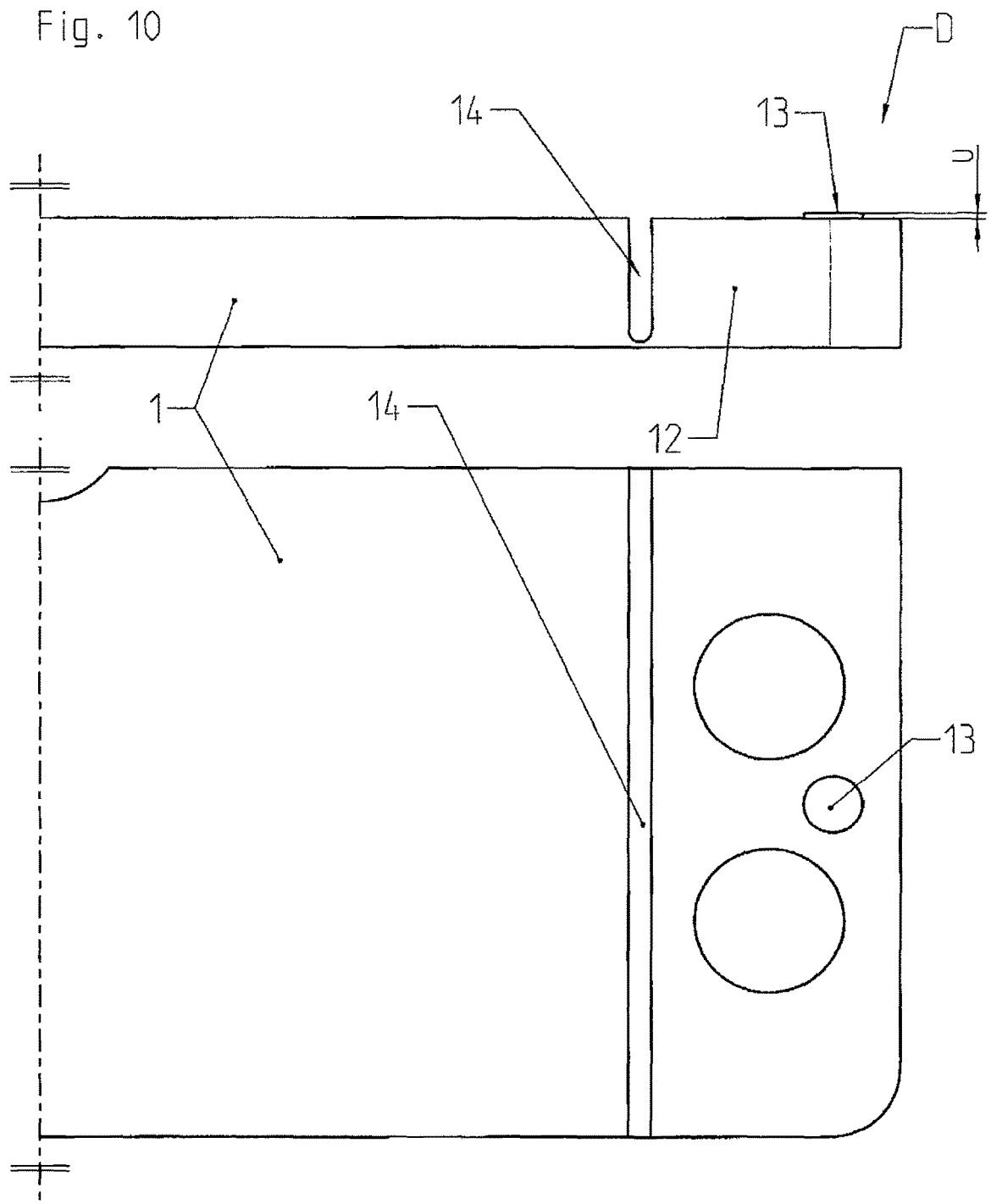
Figure 11:
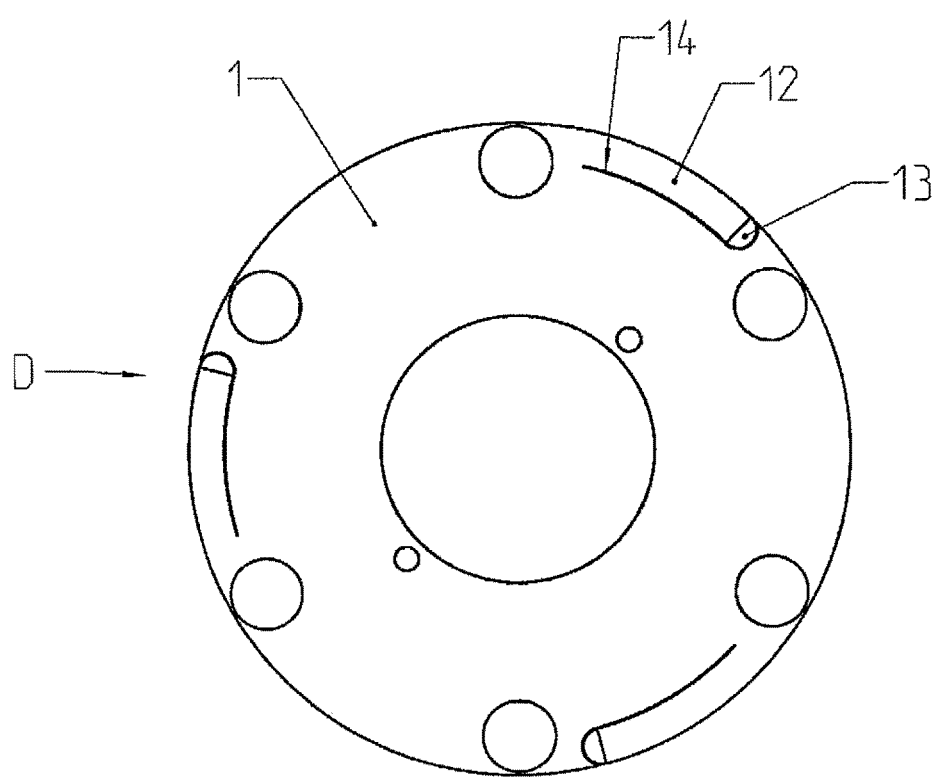
Figure 12:
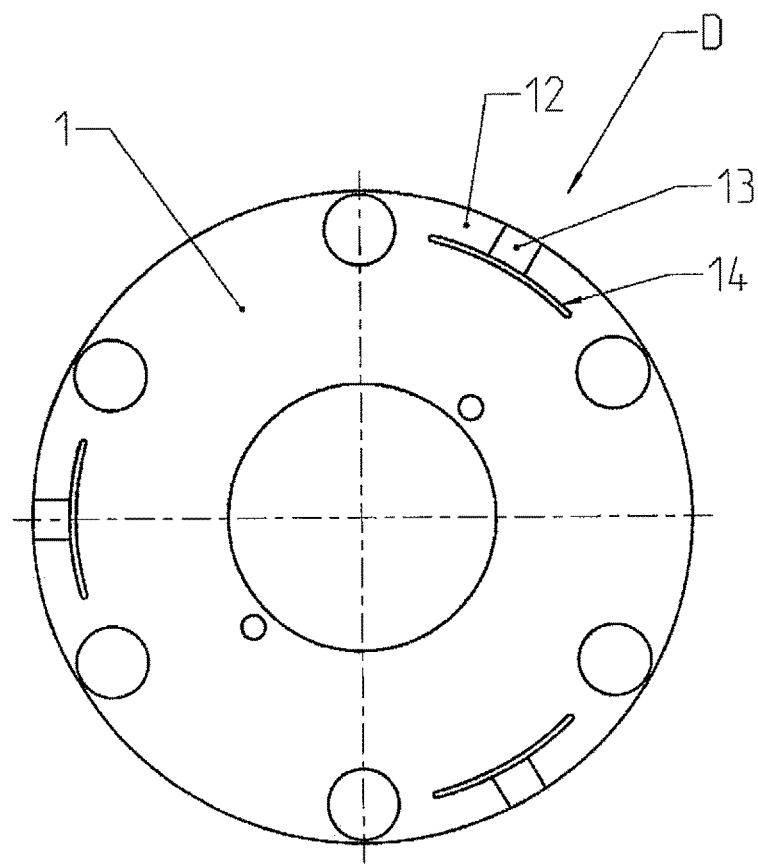
Figure 13:
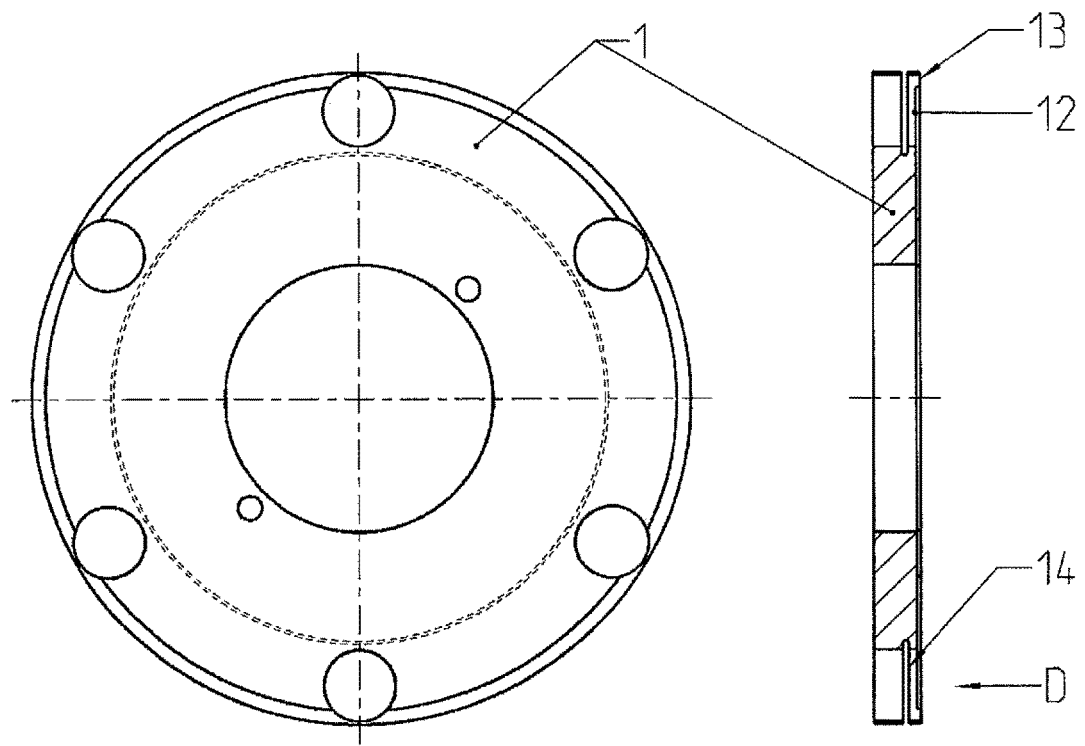
Figure 14:
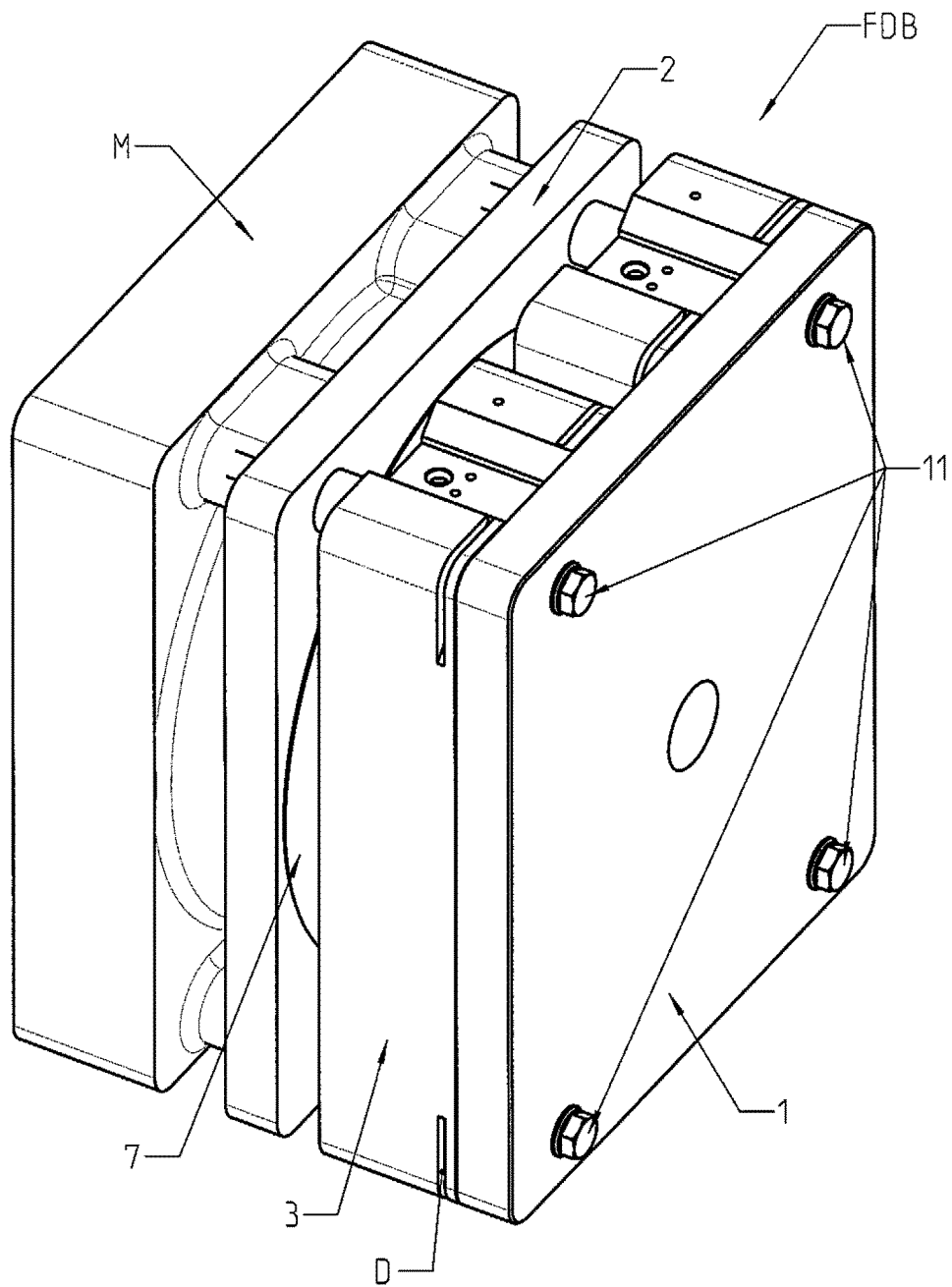

The object of the invention is achieved with the features of the main claim. Further advantageous details of the invention emerge from the dependent claims and from the description of the drawings mentioned below, which illustrate various exemplary embodiments of the invention. Shown is:

FIG. 1 A so called rectangle brake,

FIG. 1.1 The aforementioned rectangle brake in full section with an integral damper structure according to the present invention, FIG. 1.2 A detail of the rectangle brake with the integral damper structure according to the invention, FIG. 1.3 Another detail of such a rectangle brake with a slightly modified integral damper structure, FIG. 2 An armature disk of a rectangle brake in full section with the integral damper structure according to the invention, FIG. 3 Shows a coil carrier of a rectangle brake in full section with an integral damper structure, FIG. 4 Three armature disks of a rectangle brake with different slot contours for the formation of the damper structure according to the invention, FIG. 5 Shows an armature disk of a rectangular brake with a straight slot contour, FIG. 6 Shows a partial section through a further armature disk with an integral damper structure with an inserted pin for forming the foot, FIG. 7 An armature disk with an integral damper structure according to the invention with a sheet metal arranged thereon, FIG. 8 Shows a partial section through an armature disk with the integral damper structure with an adjusting screw therein, FIG. 9 Shows a partial section through an armature disk with an integral damper structure with a jackscrew therein, FIG. 9A Shows a partial section through an armature disk with an integral damper structure with a foot in the form of a ball or roller therein, FIG. 10 Shows a partial side and top view of an armature disk with the integral damper structure according to the invention in the form of a pole face slot therein, FIG. 11 Shows a round armature disk with the integral damper structure according to the invention with elastic circumferential tabs as an open structure in which the slot opens into the outer circumference FIG. 12 Shows a similar round armature disk with the integral damper structure with elastic circumferential tabs as a closed structure, in which the slot runs in sections parallel to the outer circumference FIG. 13 Shows a round armature disk with an integral damper structure on the outer circumference in the form of a circumferential, annular elastic tab, FIGS. 14 and 15 Show perspective representations of electromagnetically releasing spring-pressure brakes in a fail-safe design with the integral damper structure according to the invention, but with a functional reversal of the internal movement sequence, and FIG. 15.1 shows the subject of FIG. 15 in full section.

FIG. 1 shows a perspective view of an electromagnetically releasing spring-pressure brake (FDB) in fail-safe construction, which is composed of two brake circuits acting on the same rotor (7). This is a common design of a redundant fail-safe brake in the passenger elevator sector. In the variant of a spring-pressure brake (FDB) shown here, two armature disks (1) arranged in parallel are assigned to the coil carrier (3). The coil carrier (3) contains a separate magnetic coil (5) and separate compression springs (4) for each armature disk (1). In this example, the spring-loaded brake (FDB) is screwed to the motor end shield (M) using several screws (11). In addition, a flange plate (2) is arranged between the motor end shield (M) and the rotor (7).

FIG. 1.1 shows a full section with a staggered through both of the brake circuits shown in FIG. 1. The coil carrier (3), which contains the compression springs (4) and the magnet coils (5), is rigidly installed on the motor end shield (M). The armature disks (1) are non-rotatably guided via bushings (6) and can move axially along the axis of rotation (A). The rotor (7), which consists of a friction lining carrier (9) connected on both sides with organic friction linings (8), is non-rotatably connected to the shaft (10) and can rotate around the axis of rotation (A) and move axially parallel to the axis of rotation (A). The flange plate (2) is clamped firmly between the motor end shield (M) and the bushing (6).

The braking effect of the spring-loaded brake (FDB) is generated by clamping of the rotor (7) between at least one armature disk (1) and the flange plate (2). The necessary axial force is applied by the compression springs (4). Thus, the shaft (10) is held by the rotor (7), which is connected to the shaft (10) in a rotationally fixed manner, and is prevented from rotating about the axis of rotation (A).

To open the spring-applied brake (FDB), the magnetic coils (5) are connected to an electrical power source. The resulting magnetic field pulls the armature disks (1) against the force of the compression springs (4) in the direction of the coil carrier (3), so that the rotor (7) is released and the braking effect is relieved. The shaft (10) is thus free to rotate.

Here, the integral damper structure (D) is integrated into the armature disks (1). This contains the elastic tabs (12), which are machined through slots (14) in the armature disks (1), but are nevertheless material fit connected to the armature disks (1). The foot (13) of the elastic tabs (12) is arranged on the side of the elastic straps (12) facing the coil support side.

The foot (13) of the elastic tabs (12) protrudes above the armature disk (1) by the protruding height (U) and is higher than the width of the air gap (15). The air gap (15) is defined as the distance between the armature disk (1) and the coil carrier (3) when the spring-loaded brake (FDB) is de-energized. This is typically 0.05 mm to 1.0 mm. The elastic tab (12) is therefore under a pretension, which causes a resultant force which repels the armature disk (1) from the coil carrier (3).

The deflection of the elastic tab (12) increases upon opening of the spring pressure brake (FDB) as the air gap (15) between the armature disk (1) and the coil carrier (3) becomes smaller. Thus the resulting force increases. The rigidity of the elastic tab (12) can be influenced by the design of the length and the thickness of the elastic tab. At the same time, the protruding height (U) of the foot (13) can be used to adjust the pretensioning of the elastic tab (12) and thus the resulting force.

When an electrical power source is switched off, the resultant force leads to the armature disk (1) being repelled from the coil carrier (3) at an early stage during the breakdown of the magnetic field. The armature disk (1) starts moving when the force from the electromagnetic field is still high. This movement is comparatively slow, so that the noise when the armature disk (1) hits the rotor (7) is low.

If the spring pressure brake (FDB) is connected to a power source, a magnetic force builds up which pulls the armature disk (1) against the spring force of the compression springs (4) to the coil carrier (3). The elastic tabs (12) are pretensioned more strongly, so an increasing force is built up, which counteracts the magnetic force and reduces the speed of the armature disk (1). This results in a quieter noise when the armature disk (1) hits the coil carrier (3).

FIG. 1.2 describes a detail from FIG. 1.1 with an exaggeratedly large deformation and an exaggeratedly large air gap (15). The armature disk (1) here has an integral damper structure (D). The elastic tab (12) with the foot (13) is separated from the armature disk (1) by the slot (14). The foot (13) with the protrusion height (U) touches the coil carrier (3). The illustration shows the open state of a spring-loaded brake (FDB), the armature disk (1) is therefore attracted to the coil carrier (3) by the force of an electromagnet. This force and the pretension in the elastic tab (12) results in the deformation of the elastic tab (12), shown in an exaggerated representation. The deformation leads to the protrusion height (U) being larger than the air gap (15).

FIG. 1.3 describes detail from FIG. 1.1 with an exaggeratedly large air gap (15). The armature disk (1) here has an integral damper structure (D) with an elastic tab (12) which is separated from the armature disk (1) by a slot (14). The foot (13) is located here on the side of the coil carrier (3). Shown is the closed state of a spring-loaded brake (FDB), the armature disk (1) is thus pushed away from the coil carrier (3) by compression springs (4). In this state, the protrusion height (U) is at least as large as the air gap (15).

FIG. 2 shows a section through an armature disk (1) as can be used in spring-pressure brakes (FDB) of FIGS. 1 and 1.1 and contains an integral damper structure (D). The slots (14) incorporated into the corners of the armature disk (1) can be seen, which delimit the elastic tabs (12) with the feet (13) from the rest of the armature disk (1).

FIG. 3 shows a section through a coil carrier (3) of a spring-loaded brake (FDB) of rectangular design, the coil carrier (3) having recesses for two separate magnet coils (5) and separate compression springs (4) for a total of two brake circuits. The coil carrier (3) contains an integral damper structure (D). The slots (14) which delimit the elastic tabs (12) from the rest of the coil carrier (3) are visible.

FIG. 4 shows three armature disks (1) in section, as can be used in the spring-loaded brakes (FDB) of FIGS. 1 and 1.1. These each contain an integral damper structure (D). The slots (14) machined into the corners of the armature disk (1), which delimit the elastic tabs (12) from the rest of the armature disk (1), can be seen. The slots (14) have different contours. These can be disposed is a curved or straight line. They can each be introduced at the corners of the armature disk (1) or extend over an entire edge of an armature disk (1).

FIG. 5 shows an armature disk (1) with an integral damper structure (D) in front view and side view. A foot (13) of the elastic tabs (12) is arranged at both ends of the armature disk (1). These are located on the pole face of the armature disk (1) and have a protrusion height (U). The slots (14) run plane-parallel to the pole face.

FIG. 6 shows an armature disk (1) with an integral damper structure (D). Here, too, the slot (14) separates the elastic tab (12) from the armature disk (1). However, the elastic tab (12) remains firmly connected to the armature disc (1). The elastic tab (12) has a bore (16) at its free end. In this there is a fixedly glued or pressed-in pin (17) which acts as a foot (13) of the elastic tab (12) and protrudes above the armature disk (1) by protrusion height (U).

FIG. 7 shows an armature disk (1) with an integral damper structure (D) in side view. Here, too, the slot (14) separates the elastic tab (12) from the armature disk (1). However, the elastic tab (12) remains firmly connected to the armature disk (1). The elastic tab (12) has a metal sheet (18) at its free end. This is fixedly connected to the elastic tab (12) by gluing, sintering or welding and acts there as a foot (13) of the elastic tab (12) with a protrusion height (U).

FIG. 8 shows an armature disk (1) with an integral damper structure (D). Here, too, the slot (14) separates the elastic tab (12) from the armature disk (1). However, the elastic tab (12) remains firmly connected to the armature disc (1). The elastic tab (12) has a threaded hole (19). An adjusting screw (20) is screwed into this, which acts as a foot (13) of the elastic tab (12). The adjustable position of the adjusting screw (20) can be used to adjust its protrusion height (U) over the elastic tab and thus also its protrusion height (U) over the armature disc (1). In this way, the pretensioning of the elastic tab (12) can be adjusted in a spring-loaded brake (FDB).

FIG. 9 likewise shows an adjustable variant of an integral damper structure (D). For ease of understanding, this is shown here with an exaggerated deformation. Here, too, a slot (14) separates the elastic tab (12) from the armature disk (1). The elastic tab has a threaded hole (19) into which an adjusting screw (20) is screwed. Here, the elastic tab (12) can be pushed away from the armature disk (1) by screwing the adjusting screw (20), whereby the elastic tab (12) experiences a misalignment with respect to the armature disk (1). This variant therefore does not require a separate foot (13). The outermost edge of the elastic tab takes on the function of the foot (13) and touches the component opposite. The further the adjusting screw (20) is screwed in in this variant, the more the elastic tab (12) is pressed away from the armature disk (1) and the pretensioning of the elastic tab (12) increases. It is equally conceivable to provide the threaded bore (19) in the component below the tab.

FIG. 9A shows an armature disk (1) with an integral damper structure (D). Here, too, the slot (14) separates the elastic tab (12) from the armature disk (1). However, the elastic tab (12) remains firmly connected to the armature disc (1). The elastic tab (12) has a depression at its free end on the outside. A cylindrical roller (21) or ball (21), which acts as a foot (13) of the elastic tab (12), is fixedly embedded in this.

FIG. 10 shows a further variant of an integral damper structure (D) of an armature disk (1). Here the slot (14) runs perpendicular to the pole face of the armature disk (1). The rigidity of the elastic tab (12) is not determined by the thickness of the elastic tab (12) itself, but by the thickness of the remaining cross-section between the elastic tab (12) and the armature disk (1). The foot (13) of the elastic tab (12) is here also part of the armature disk (1) and is firmly connected to it. The foot (13) can preferably be manufactured as part of the machining of the pole face of the armature disk (1).

FIG. 11 shows an armature disk (1) of round design with an integral damper structure (D). The slots (14) penetrate the armature disk (1) perpendicularly and completely from the pole face. They describe circular ring segments which remain connected to the armature disk (1) on one side. The slots (14) can be made in the armature disk, for example, by milling, eroding, water jet or flame cutting, or also by laser cutting. Here, the elastic tabs (12) are also separated from the armature disk (1) by the slots (14). In each case, a foot (13) is arranged in the area of the free end of an elastic tab (12).

FIG. 12 shows an armature disk (1) of round construction with an integral damper structure (D). The slots (14) also penetrate the armature disk (1) perpendicularly and completely from the pole face. Here, the slots (14) separate elastic tabs (12) in the form of circular ring segments, which, however, remain connected to the armature disk (1) at their two ends. A foot (13) is arranged in each case in the middle of an elastic strap (12).

FIG. 13 shows an armature disk (1) of round construction with an integral damper structure (D). The slot (14) here also runs parallel to the pole face of the armature disk (1) and extends over the entire circumference. This results in a circumferential elastic tab (12) similar to a plate spring, which can be interrupted with through-holes due to the construction of the armature disk (1). The circumferential elastic tab (12) here has a circular circumferential foot (13).

Further FIGS. 14, 15 and 15.1 are intended to clarify that the integral damper structure according to the invention can also be used for braking with a functional reversal of the progression of movements. Brakes are therefore contemplated in which the armature disk is rigidly connected to the motor end shield/machine wall and the coil carrier moves axially when the brake is opened and closed. In this case, the rotor is clamped between the flange plate/motor end shield and the coil carrier.

FIG. 14 shows a perspective illustration of an electromagnetically releasing spring-loaded brake (FDB) in closed-circuit construction, which is composed of two brake circuits acting on a rotor (7). In the variant of the spring-loaded brake (FDB) shown here, the fixedly mounted armature disk (1) is disposed two floating coil supports (3). The coil carriers each contain at least one magnetic coil (5) and separate compression springs (4). In the present example, the armature disk (1) is screwed to the motor end shield (M) using several screws (11). In addition, a flange plate (2) is arranged between the motor end shield (M) and the rotor (7). If the spring pressure brake (FDB) described here is not supplied with electrical energy, the coil carriers (3) push each other off the armature disk (1) by the compression springs (4), so that the rotor (7) between the coil carriers (3) and the Flange plate (2) is frictionally clamped. In the version of the spring-loaded brake (FDB) described here, the integral damper structure (D) can be integrated both in the coil carrier (3) and in the armature disk (1).

FIGS. 15 and 15.1 show a three-dimensional view or a longitudinal section of an electromagnetically releasing spring-loaded brake (FDB) in fail-safe design, which is composed of two brake circuits acting on one rotor (7). In the variant of the spring-loaded brake (FDB) shown here, two separate fixedly mounted armature disks (1) are assigned to two floating coil carriers (3). The coil carriers each contain at least one magnetic coil (5) and separate compression springs (4). In the present example the armature disks (1) are screwed to the motor end shield (M) using several screws (11). In addition, a flange plate (2) is arranged between the motor end shield (M) and the rotor (7). If the spring-loaded brake (FDB) described here is not supplied with electrical energy, the coil carriers (3) push each other off the armature disks (1) by the compression springs (4) so that the rotor (7) is frictionally clamped between the coil carriers (3) and the Flange plate (2). In the version of the spring-loaded brake (FDB) described here, the integral damper structure (D) is integrated in the armature disks (1).

In the electromagnetic switchable brake according to the invention, the elastic tab (12) fitted with a foot (13) can touch the opposite component in the open and closed state of the brake, or the elastic tab (12) touches the opposite component equipped a foot (13), or the elastic tab (12) touches the opposite component directly.

Preferably, the elastic tab (12), like the associated armature disk or the coil carrier, is made of a ferrous material.

The electromagnetically switchable brakes described above can be a brake based on the fail-safe principle (FDB), in which, when the coil (5) is deactivated, the armature disk (1), actuated by a permanently acting force, preferably from compression springs (4), is repelled by the coil carrier (3) and thereby brakes the rotor (7) connected in a rotationally fixed manner to the shaft (10). At the same time, with this principle, the armature disk (1) is attracted to the coil carrier (3) by the force of an electromagnet against the permanent force.

Regardless of the preceding paragraph, the electromagnetically switchable brake can also be a brake based on the operating current principle, in which the armature disk (1) is connected to the shaft (10) in a rotationally fixed manner and is drawn by the force of an electromagnet to the coil carrier (3).

In the case of a coil carrier (3) or an armature disk (1) of an electro-magnetically switchable brake with the integral damper structure (D) according to the invention, at least one elastic tab (12) can be, as part of the manufacture or processing of the coil carrier or armature disk, be worked from the aforementioned component by a material-separating process.

In the case of a coil carrier (3) or an armature disk (1) of an electro-magnetically switchable brake with the integral damper structure (D) according to the invention, the contours of the elastic tab (12) can, the context of the manufacture or machining of the coil carrier or armature disk, be manufactured using a laser cut.

The contour of the elastic tab (12) according to the invention can also be produced using a water jet cut or a flame cut.

The coil carrier (3) or the armature disk (1) of this electromagnetically switchable brake according to the invention can be produced in a particularly cost-saving and efficient manner in that the contour of the elastic tab (12) is realized in the same machining process that is used for production of the coil carrier (3) or the armature disk (1).

In the case of a coil carrier (3) or an armature disk (1) of an electromagnetically switchable brake according to the invention, the foot (13) in question can also be produced in an embossing process.

LIST OF REFERENCE SYMBOLS

FDB Spring loaded brake
A Axis of rotation
M Motor end shield
D integral damper structure
U Protruding height
1 Armature disk
2 Flange plate
3 Coil carrier
4 Compression spring
5 Solenoid
6 Bushing
7 Rotor
8 Friction lining
9 Friction lining carrier
10 Shaft
11 Screw
12 Elastic tab
13 Foot
14 Slot
15 Air gap
16 Bore
17 Pin
18 Sheet metal
19 Threaded bore
20 Adjusting screw
21 Cylindrical roller/Ball

The invention claimed is:

1. Electromagnetically switchable brake, comprising:
at least one coil carrier (3) and at least one armature disk (1), wherein an axial distance between the coil carrier (3) and the armature disk (1) relative to one another is variable;
at least one rotor (7) on at least one hub of a shaft to be braked; and
damping members arranged between the armature disk (1) and coil carrier (3) between facing end faces of the coil carrier (3) and the armature disk (1),
characterized in that a solid body of at least one of the coil carrier (3) or the armature disk (1) has the damping members in the form of an integral damper structure (D) which is composed of at least one elastic tab (12) and a foot (13), wherein the elastic tab (12) is an integral part of the solid body and wherein the elastic tab (12) is prestressed in a direction parallel to an axis of rotation (A).

2. Electromagnetically switchable brake according to claim 1, characterized in that the solid body of the coil carrier (3) or armature disk (1) has at least one machined slot (14) to arrange part of the coil carrier (3) or of the armature disk (1) as the integral damper structure (D).

3. Electromagnetically switchable brake according to claim 2, characterized in that the slot (14) originates from at least one of (i) an edge or circumference of the solid body, or (ii) an end face of the armature disk (1).

4. Electromagnetically switchable brake according to claim 2, characterized in that the slot (14) runs from a respective end face or from an edge or circumference of at least one of the armature disk (1) or the coil carrier (3) with fixed or variable spacing through the solid body, such that the solid body forms the elastic tab (12) which, at the tab's outer end, receives or touches the foot (13).

5. Electromagnetically switchable brake according to claim 2, characterized in that the slot (14) runs parallel to and spaced from a respective end face of the armature disk (1) or the coil carrier (3).

6. Electromagnetically switchable brake according to claim 1, characterized in that the solid body is rectangular.

7. Electromagnetically switchable brake according to claim 6, characterized in that a respective slot (14) is provided in a corner region of the armature disk (1) or the coil carrier (3).

8. Electromagnetically switchable brake according to claim 1, characterized in that the foot (13) is formed by a pin (17) which is disposed in a bore (16) in the elastic tab (12) or in a bore (16) in an opposite component, and the foot (13) has a protruding height (U).

9. Electromagnetically switchable brake according to claim 1, characterized in that the foot (13) is formed from sheet metal (18) which is attached to the elastic tab (12) or to an opposite component, and the foot (13) has a protruding height (U).

10. Electromagnetically switchable brake according to claim 1, characterized in that the foot (13) is formed from an adjusting screw (20) which is disposed in a threaded hole (19) in the elastic tab (12) or in a threaded hole (19) in an opposite component, and the foot (13) has a protruding height (U).

11. Electromagnetically switchable brake according to claim 1, characterized in that the elastic tab (12) or an opposite component is provided with a depression in which a cylindrical roller or a ball is embedded, which acts as the foot (13).

12. Electromagnetically switchable brake according to claim 1, characterized in that the elastic tab (12) or the armature disk (1) or the coil carrier (3) is provided with a threaded bore (19) into which an adjusting screw (20) engages, with which the elastic tab (12) can be pushed away from the armature disk (1).

* * * * *